Patented Nov. 4, 1930

1,780,652

UNITED STATES PATENT OFFICE

WALTER E. LAWSON, OF WILMINGTON, DELAWARE, ASSIGNOR TO E. I. DU PONT DE NEMOURS & COMPANY, OF WILMINGTON, DELAWARE, A CORPORATION OF DELAWARE

COATING COMPOSITION

No Drawing.     Application filed May 18, 1928. Serial No. 278,918.

My invention relates to the use of tetrahydrofurfuryl alcohol, and specifically to the use of tetrahydrofurfuryl alcohol in compositions of matter and coating compositions containing vinyl compounds.

It has been found that vinyl compounds and polymerized vinyl esters, in particular, are valuable constituents as film bases and in brushing lacquers or enamels. I have found that tetrahydrofurfuryl alcohol is an excellent solvent for vinyl compounds and particularly polymerized vinyl esters. This solvent power is unexpected, in view of the known insolubility of vinyl chloride polymers in the usual type of alcohols, and because of the known insolubility of polymerized vinyl acetate in butyl and higher alcohols. The comparative insolubility of the vinyl ester polymers in higher boiling alcohols has rendered it difficult, if not impossible, to use the vinyl esters in brushing lacquers or enamels which require the presence of high boiling solvents. Since lacquers and enamels dry by evaporation of the solvents, and a large percentage of the material applied as lacquer goes off into the air, the production of lacquers and enamels is commercially feasible only as the result of the discovery and use of solvents which are available at a moderate price, which are active solvents, free from objectionable color and odor, and are compatible with the ordinary solvents, diluents and pigments used in lacquers and enamels. I have found that tetrahydrofurfuryl alcohol embodies these desirable qualities when used as a solvent for vinyl compounds.

My invention in its broad aspects consists in the discovery that tetrahydrofurfuryl alcohol is a very desirable ingredient in lacquers or enamels formed from vinyl compounds. It has a high boiling point of 180° C., with the further advantage that it has the proper evaporation rate which avoids any tendency toward the precipitation of the vinyl compound, and consequent loss of gloss.

Examples of coating compositions embodying my discovery are given below:

Example 1

| | Parts by weight |
|---|---|
| Vinyl acetate polymer | 33.3 |
| Tetrahydrofurfuryl alcohol | 10 |
| Ethyl acetate | 5 |
| Ethyl alcohol | 5 |
| Toluene | 20 |
| Butyl acetate | 30 |
| Chlorobenzene | 30 |
| | 133.3 |

The above composition gives a very good, clear lacquer.

As an example of a pigmented lacquer, I give the following:

Example 2

| | Parts by weight |
|---|---|
| Vinyl chloride, acetone soluble polymer | 22 |
| Tetrahydrofurfuryl alcohol | 15 |
| Ethyl acetate | 15 |
| Acetone | 15 |
| Butyl acetate | 25 |
| Chlorobenzene | 30 |
| Peerless black | 2.5 |
| | 124.5 |

In preparing this lacquer the pigment is ground in the presence of the vinyl chloride polymer in any suitable manner, such as in a pebble mill or ball mill. The pigmenting may be carried out in any suitable manner, but I have found it well to employ a mill base having the following composition:

| | Parts by weight |
|---|---|
| Peerless black | 2.5 |
| Vinyl chloride solution | 61 |
|    Butyl acetate _____ 12.5 | |
|    Chlorobenzene _____ 15 | |
|    Acetone _____ 7.5 | |
|    Ethyl acetate _____ 7.5 | |
|    Tetrahydrofurfuryl alcohol _____ 7.5 | |
|    Vinyl chloride _____ 11 | |
| | 63.5 |

When the pigment has been thoroughly incorporated into this mill base, the remainder of the vinyl chloride solution may be added in order to bring the constituents up to the ratios indicated in Example 2.

Example 3

I have found that satisfactory coating compositions may be formed from tetrahydrofurfuryl alcohol together with other vinyl esters. A spraying lacquer containing polymerized vinyl chloracetate, is as follows:

|  | Parts by weight |
|---|---|
| Polymerized vinyl chloracetate | 22 |
| Acetone | 15 |
| Ethyl acetate | 40 |
| Butyl acetate | 35 |
| Tetrahydrofurfuryl alcohol | 10 |
|  | 122 |

It has been found that when vinyl chloride is exposed to light a vinyl chloride polymer results, which is, in fact, a mixture of products, the greater portion of which is soluble in acetone, esters and similar solvents. A small proportion of the polymers or mixtures of polymers, however, is insoluble in acetone, and has, in fact, an extremely limited range of solvents. The separation of the alpha, or soluble form, from the beta, or insoluble form, can be accomplished but is undesirable from a cost standpoint since there is involved an additional operating step and a decrease in the amount of product otherwise useable. I have found that the incorporation of tetrahydrofurfuryl alcohol in the solvent mixture for such mixed vinyl chloride polymers is most desirable. The beta, or acetone insoluble polymer of the vinyl chloride, is soluble to a considerable extent in tetrahydrofurfuryl alcohol.

The value of tetrahydrofurfuryl alcohol in this connection is shown by the fact that while 13% is about the maximum concentration, obtainable without gelling, in a 4:1 or 3:2 mixture of alpha and beta vinyl chloride polymers in a solvent composed of 50% butyl acetate and 50% chlorobenzene, the concentration of the vinyl chloride polymer may be increased to at least 17% solely by the substitution of 10% tetrahydrofurfuryl alcohol for an equal volume of chlorobenzene.

It is thus possible to use both the alpha and beta polymers of vinyl chloride in brushing lacquers. An example of this use is as follows:

Example 4

|  | Parts by weight |
|---|---|
| Vinyl chloride—alpha polymers | 14 |
| Vinyl chloride—beta polymers | 3.5 |
| Tetrahydrofurfuryl alcohol | 10 |
| Butyl acetate | 40 |
| Ethyl acetate | 10 |
| Chlorobenzene | 40 |
| Chrome green | 10 |
|  | 127.5 |

This enamel may be prepared by grinding a mill base in any suitable manner as in a ball mill or pebble mill, and then adding the remainder of the unpigmented vinyl chloride solution to the mill base. A suitable mill base for this purpose is as follows:

|  | Parts by weight |
|---|---|
| Chrome green | 10 |
| Vinyl chloride solution | 58.75 |
|   Vinyl chloride—alpha polymer | 7 |
|   Vinyl chloride—beta polymer | 1.75 |
|   Butyl acetate | 20 |
|   Ethyl acetate | 5 |
|   Chlorobenzene | 20 |
|   Tetrahydrofurfuryl alcohol | 5 |
|  | 68.75 |

Although the enamel given under Example 4 consists of a mixture of alpha and beta polymers of vinyl chloride, I do not wish to be limited to these specific proportions since any suitable mixture of the polymers may be employed. In fact, a light polymerized vinyl chloride may be employed without separating the alpha and beta polymers.

In addition to the particular desirability of tetrahydrofurfuryl alcohol in compositions containing polymerized vinyl esters, as exemplified hereabove, and in compositions containing the mixed polymers of vinyl chloride, it is valuable in compositions containing two or more quite different vinyl esters, such as, for example, mixtures of vinyl chloride polymer and vinyl acetate polymer. A mixture of two polymerized vinyl esters which is quite suitable for spraying, is as follows:

|  | Parts by weight |
|---|---|
| Vinyl chloride, alpha polymer | 11 |
| Polymerized vinyl acetate | 11 |
| Ethyl acetate | 25 |
| Butyl acetate | 25 |
| Toluene | 40 |
| Tetrahydrofurfuryl alcohol | 10 |
|  | 122 |

As many apparently widely different embodiments of this invention may be made without departing from the spirit thereof, it is to be understood that I do not limit myself to the foregoing examples or descriptions except as indicated in the following patent claims.

I claim:

1. A composition of matter containing a polymerized vinyl compound and tetrahydrofurfuryl alcohol.

2. A composition of matter containing a polymerized vinyl ester and tetrahydrofurfuryl alcohol.

3. A composition of matter containing a vinyl chloride polymer and tetrahydrofurfuryl alcohol.

4. A composition of matter containing polymerized vinyl compounds and tetrahydrofurfuryl alcohol.

5. A composition of matter containing polymerized vinyl esters and tetrahydrofurfuryl alcohol.

6. A composition of matter containing light-polymerized vinyl chloride and tetrahydrofurfuryl alcohol.

7. A composition of matter containing acetone-insoluble vinyl chloride polymer and tetrahydrofurfuryl alcohol.

8. A composition of matter containing vinyl chloride polymer, vinyl acetate polymer and tetrahydrofurfuryl alcohol.

9. A polymerized vinyl ester composition containing a pigment and tetrahydrofurfuryl alcohol.

In testimony whereof, I affix my signature.

WALTER E. LAWSON.